Figure 1:
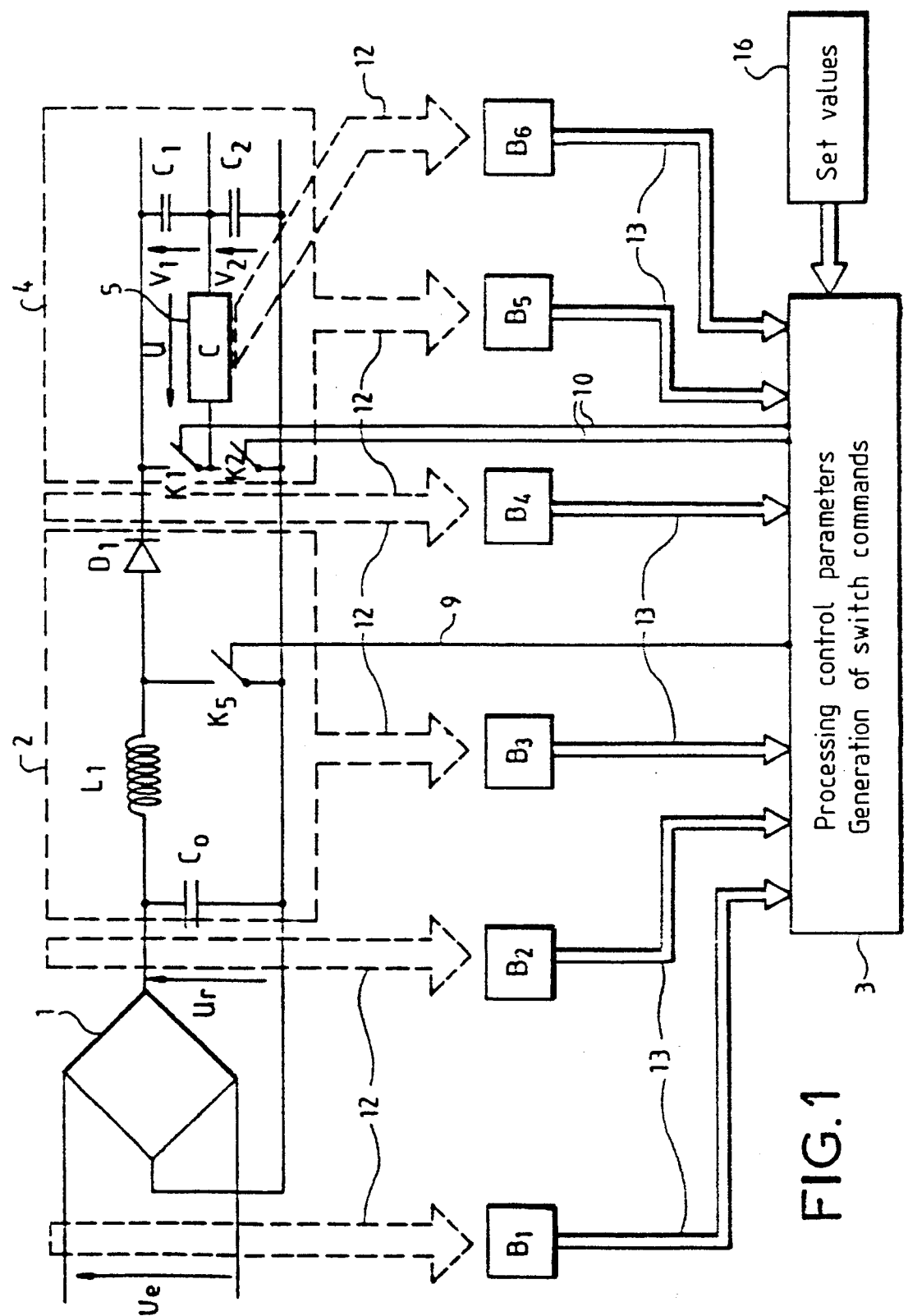

United States Patent [19]
Bidaud et al.

[11] Patent Number: 5,592,368
[45] Date of Patent: Jan. 7, 1997

[54] STATIC FREQUENCY CONVERTER WHICH COMPENSATES FOR FLUCTUATIONS IN A VOLTAGE SOURCE WHILE CONTROLLING THE WAVEFORM APPLIED TO A CHARGE WHILE CONTROLLING THE WAVEFORM APPLIED TO A CHARGE

[75] Inventors: Francis Bidaud, Duclair; Sylvain Benoit, Artas; Jacques Plisson, Barentin; Gérard Rilly, Unterkirnach; Gérard Morizot, Villingen; Harald Roth, Munchweiler, all of France

[73] Assignee: L'Unite Hermetique, La Verpilliere, France

[21] Appl. No.: 174,418

[22] Filed: Dec. 28, 1993

[30] Foreign Application Priority Data

Dec. 30, 1992 [FR] France .................................... 92 15911

[51] Int. Cl.$^6$ ............................. H02J 3/00; H02M 5/40
[52] U.S. Cl. .................................................. 363/34
[58] Field of Search ........................ 363/34, 98, 37, 363/47

[56] References Cited

U.S. PATENT DOCUMENTS

| | | | |
|---|---|---|---|
| 4,533,986 | 8/1985 | Jones | 363/17 |
| 4,719,559 | 1/1988 | Sokal et al. | 363/98 |
| 4,788,485 | 11/1988 | Kawagishi et al. | 363/37 X |
| 4,827,151 | 5/1989 | Okado | 363/37 X |
| 4,855,652 | 8/1989 | Yamashita et al. | 363/37 X |
| 5,063,490 | 11/1991 | Maehara et al. | 363/98 X |
| 5,111,376 | 5/1992 | Mehl | 363/71 |

FOREIGN PATENT DOCUMENTS

0504094A2  9/1992  European Pat. Off. .
2125239    2/1984  United Kingdom .

*Primary Examiner*—Edward H. Tso
*Attorney, Agent, or Firm*—Oblon, Spivak, McClelland, Maier & Neustadt, P.C.

[57] ABSTRACT

The static frequency converter controlled by a control parameter processing and command generation element includes an active filter at the terminals of a dc/dc converter powering a load, wherein the active filter includes an inductance (L1) in series with a diode (D1) grounded through a condenser (C0) and a switch (K5) controlled by the control parameter processing and command generation element and that the dc/dc converter includes at least one complete bridge, one of the arms of which has two condensers (C1,C2) and the other arm has four switches (K1...K4). This converter can be used with all load types that can be controlled by frequency converters, and more particularly to a transformer type inductive load or alternating electric motors, with or without commutators, and particularly to single phase and multiphase asynchronous motors.

2 Claims, 5 Drawing Sheets

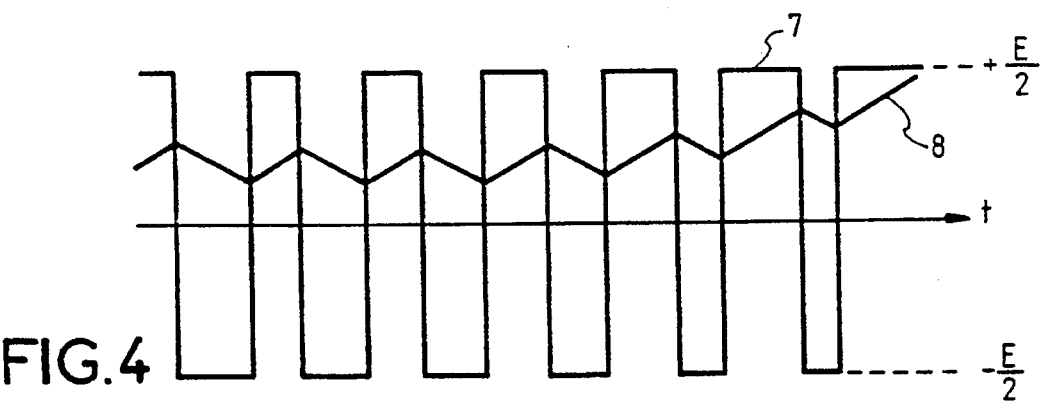
FIG. 3
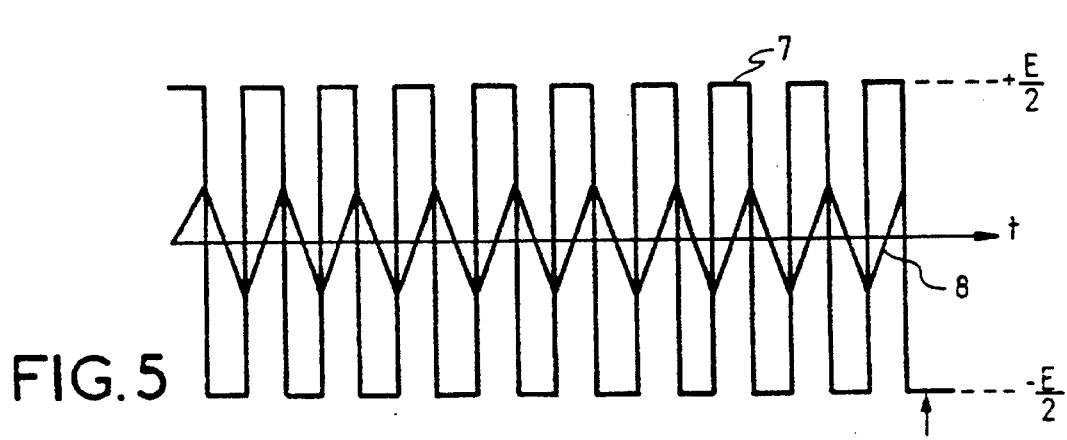
FIG. 4
FIG. 5

5,592,368

STATIC FREQUENCY CONVERTER WHICH COMPENSATES FOR FLUCTUATIONS IN A VOLTAGE SOURCE WHILE CONTROLLING THE WAVEFORM APPLIED TO A CHARGE WHILE CONTROLLING THE WAVEFORM APPLIED TO A CHARGE

I. BACKGROUND OF THE INVENTION

This invention concerns a static alternating/direct/alternating or direct/alternating frequency converter controlled by a control parameter processing and command generation module acting as a power supply to all types of loads and particularly inductive loads such as electrical motors or transformers.

II. DESCRIPTION OF THE PRIOR ART

The principle of a power supply for a load such as an electric motor making use of an alternating voltage wave of variable frequency and amplitude is known. A dc voltage source is switched in order to obtain a required shape wave adapted to the operation of the load at the terminals of said load. When the power supply source is alternating, for example network power, an intermediate module is inserted to create a dc wave that will be switched using a PWM (Pulse Width Modulation) process so that the required voltage shape can be applied to the terminals of the load. If the power supply source is already dc, it can be switched directly using the PWM process.

This type of device controlled by a PWM process generally consists of an alternating/direct rectifier element placed between the network and the frequency converter module that powers the motor, and the switches of which are controlled by a PWM type process. When this rectifier element is a passive rectifier with capacitive and/or inductive filtering, the device can disturb the power supply network by current harmonics picked up when the converter is in operation. This type of device may then be incompatible with some standards such as European standard IEC 555.

One solution to this network pollution problem is to use this passive rectifier fitted with a condenser and/or a coil together with a passive filter between the network and the rectifier element, but this solution is only economically viable for an input power to the device of below the order of 500 Watts.

For input powers higher than the order of 500 Watts, it is preferable to use an active filter such as that described in SIEMENS patent DE 3 328 723. This type of module (rectifier+active filter) is more frequently called a "sinusoidal rectifier", that takes energy from the network in a distributed manner throughout the mains period. The current picked up is free of harmonics and is in phase with the network.

III. SUMMARY OF THE INVENTION

This invention concerns a static AC/DC/AC or DC/AC frequency converter, in the case of an AC/DC/AC converter comprising a rectifier means at the terminals of an active filter, an active filter at the terminals of a dc-ac converter, wherein the active filter in this static frequency converter consists of an inductance in series with a diode connected to the ground in parallel by a condenser in parallel with a controlled switch, and that the dc-ac converter has at least one complete bridge one arm of which contains two condensers and the other arm contains two controlled switches.

This frequency converter is also controlled by a control parameter processing and switch command generation element that uses at least one physical magnitude out of the power supply source, the rectifier output, the active filter, the active filter output, the dc-ac converter, or the load in order to servocontrol the active filter switch and dc-ac converter element switches.

IV. BRIEF DESCRIPTION OF THE DRAWINGS

Figure 2:
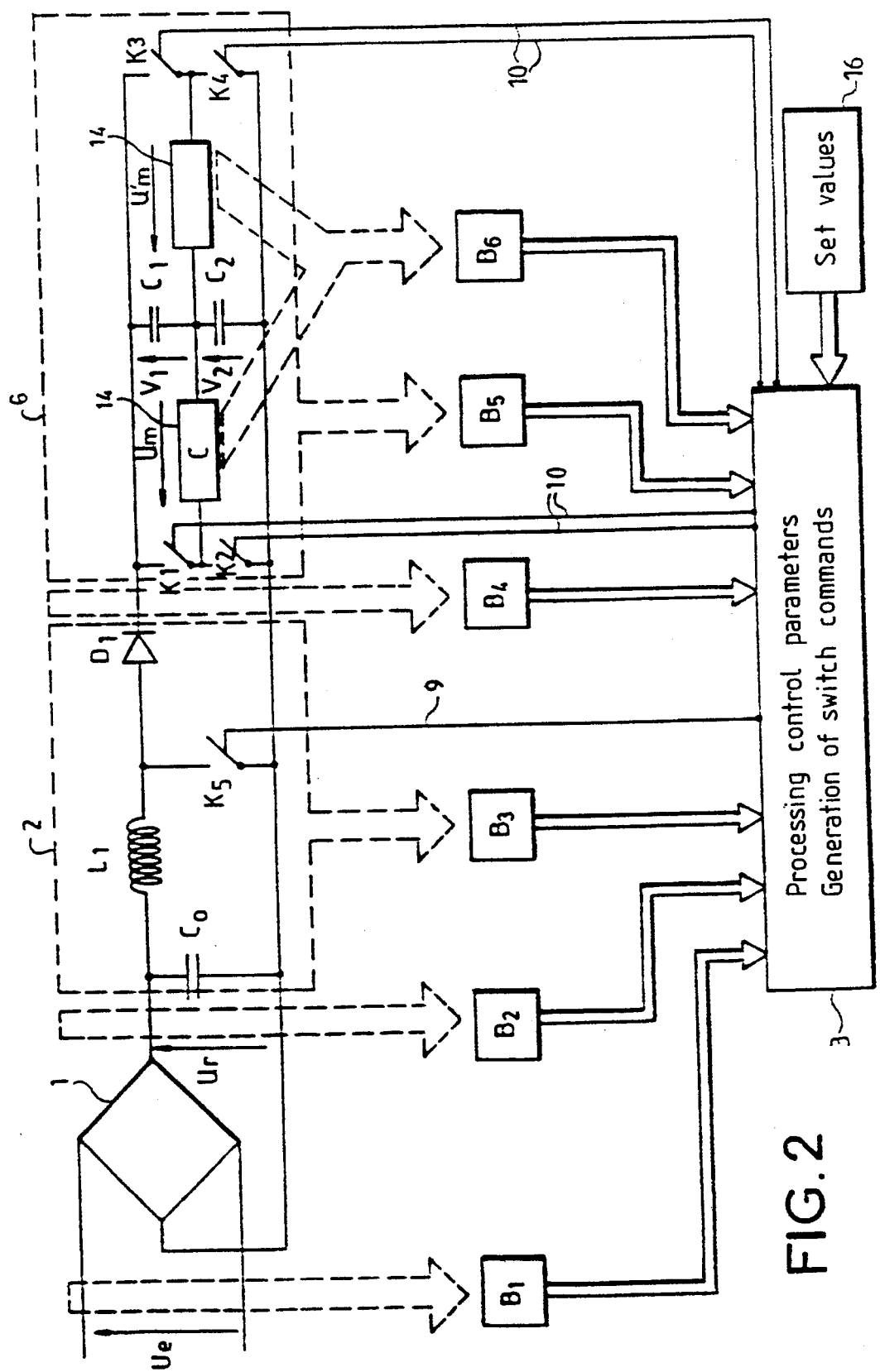
Figure 6:
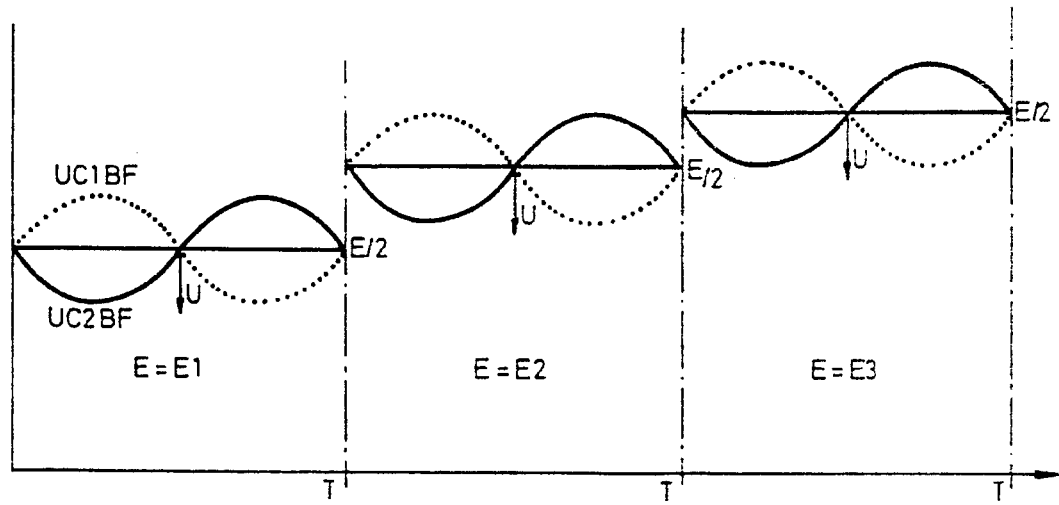
Figure 7:
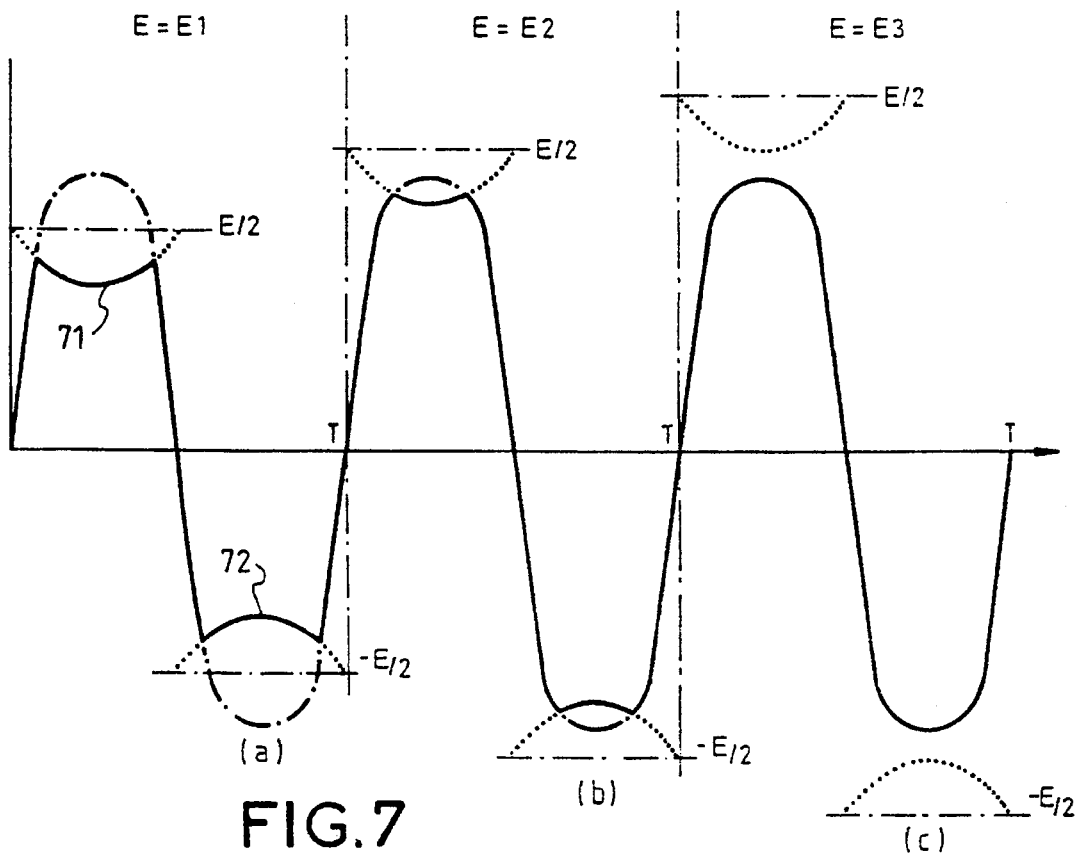
Figure 8:
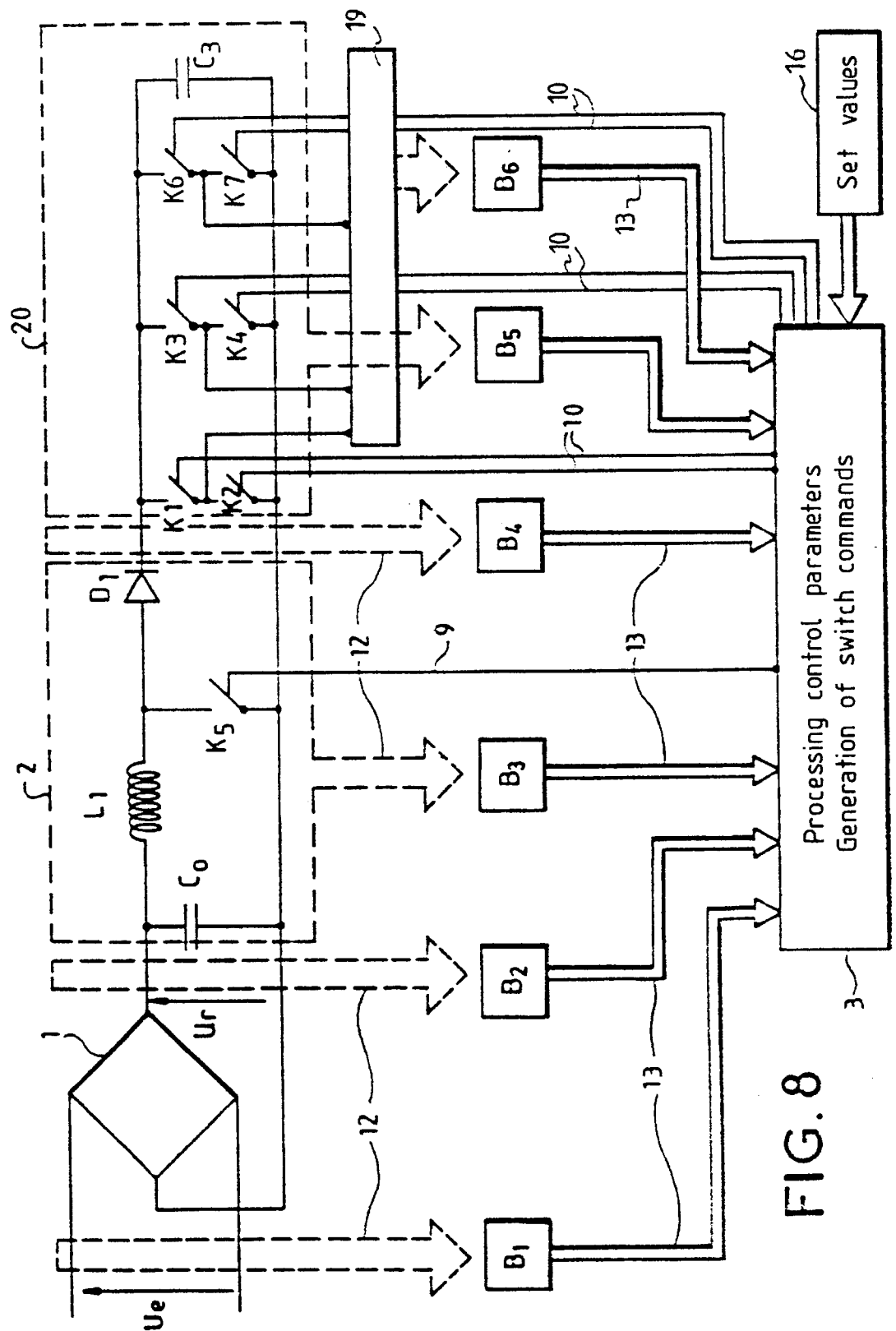

The invention will be better understood and the advantages will appear by reading the following description illustrated by the following figures:

FIG. 1 shows a static frequency converter in accordance with the invention powering a single phase load, FIG. 2 shows a static frequency converter according to the invention powering a two-phase load, FIG. 3 shows a table showing possible ways in which the various control parameter blocks may be combined, FIG. 4 shows the relation between pulse width at the terminals of an inductive load and the flux response of this load, FIG. 5 shows a special use of the principle of the previous figure according to one of the characteristics of the invention, FIG. 6 shows voltage variations for three values of the voltage at the terminals of the dc-ac converter element, at the terminals of the condensers in the dc-ac converter element of the device according to the invention, during one period, FIG. 7 shows voltage deformations at the load terminals over one period, for three special values of the voltage at the terminals of the dc-ac converter element, and FIG. 8 shows a static frequency converter according to the invention powering a three-phase load.

V. DESCRIPTION OF A PREFERRED EMBODIMENT

In the following description, the voltage Um applied to the load terminals contains a UmLF component that is the low frequency voltage at the load terminals, where low frequency voltage means frequencies of the same order of magnitude as the fundamental of the load voltage or its harmonics, and a UmHF component that is the high frequency voltage at the motor terminals, in other words frequencies of the same order of magnitude as the PWM switching frequency or its harmonics.

Also in order to facilitate understanding the following description, components used in the static frequency converter are considered as being ideal, unless mentioned otherwise.

FIG. 1 shows a frequency converter according to the invention powering a single phase load 5. This frequency converter picks up energy at a voltage source Ue through a rectifier means 1 of the diode bridge type or any other known rectifier device. The rectified voltage Ur is applied to the terminals of an active filter 2 comprising a diode D1 and a switch K5 controlled by an element 3 that processes control parameters and generates commands for switches K1, K2 and K5 of the device. This active filter 2 outputs a dc voltage E to a dc-ac converter 4 consisting of a complete bridge, one of the arms of which consists of two condensers C1 and C2 and the other arm consists of two switches K1 and K2 controlled by a PWM type process output by element 3. The creation of a mid-point powers the single phase load 5 with a 2-pole wave Um varying between +E/2 and −E/2. In FIG. 1, the powered load 5 is a single phase load, but the following description may be easily extended to the frequency converter according to the invention being used as the power supply of a two-phase load, as will be seen later in the description of FIG. 2.

The structure of this type of frequency converter has a number of advantages.

First, it eliminates the need for two active switches and their corresponding control devices and reduces the dimensions necessary for heat sinks. In some special cases losses in capacitances C1 and C2 are less than losses, if any, in the two switches that they replace.

C1 and C2 perform the function of low frequency (LF) filters, normally performed by the active filter capacitance CO. CO no longer performs a high frequency (HF) filtering and its values may be reduced. C1 and C2 contribute to limiting the voltage ripple ratio at the load terminals.

Also, placing C1 and C2 below the active filter rather than immediately behind the passive rectifier bridge as is done in other known devices in which a high capacitance at this location acts as an energy reservoir, makes it possible to use large values of C1 and C2 while using smaller values than would be necessary for a capacitance located immediately behind the passive rectifier bridge. This makes it possible to satisfactorily filter ripples in the voltage E without needing to install an LF filter inductance necessary to reduce mains harmonic currents.

Starting from set value data 16, a circuit control parameter processing and command generation element 3 opens and closes switches K1. K2 and K5 in order to output the required wave to the terminals of the load 5.

FIG. 1 shows an example of the location of these parameters. Each parameter control block B1 to B6 (their number is not restrictive) corresponds to a location of circuit control parameter pick up points connected by means such as sensor 12. These blocks transmit these parameters through connections 13 to the control parameter processing element 3 that starts from input set values 16 and generates commands to switches K1, K2 and K5 through connections 9 and 10

Thus, block B1 contains control parameters for the energy source Ue (network), B2 for the rectifier 1 output, B3 for the active filter 2, B4 for the active filter 2 output, B5 for the dc-ac converter element 4, and B6 for the load 5 powered by the device according to the invention.

The control parameters for these blocks are physical magnitudes, for example such as voltages, currents, powers, temperatures, displacements, speeds, accelerations, pressures, magnetic fields or electrical fields. The number of these blocks may vary, blocks B1 to B6 may or may not be present, or they may be combined and/or weighted. FIG. 3 represents the various selection modes and possible types of combinations of these 6 blocks using ORs and ANDs. This figure does not show any weighting, but the following combination is one example of how to use the table in FIG. 3:

(10×B2) OR (5×B1) AND (0.5×B6).

The user can thus input set values 6 into the control parameter processing and command generation element 3 of the device, apply the required wave shape to the load and use block B control parameter measurements to modify the wave shape.

The frequency converter according to the invention is particularly suitable for the power supply of an inductive type of load (for example electrical motor) with apparent resistance R and inductance L, and can give additional advantages other than those mentioned above for an arbitrary load.

If tmax is the maximum time during which the voltage +E/2 or −E/2 (where E is the rectified and filtered direct voltage applied to the terminals of the arms containing condensers C1 and C2 and switches K1 and K2 in the dc-ac converter 4) must be applied to the terminals of the inductive load, superoscillations will occur due to the indexed response of the (R,L, C1,C2) circuit. These superoscillations will deform the voltage wave applied to load 5 and will strongly vary the potential of the mid-point of condensers C1 and C2, possibly to the extent of reversing their polarity. In order to avoid this problem it is known that, for the case in which C=C1=C2 are nominal values:

$$\frac{2\pi \sqrt{2LC}}{\sqrt{1 - \frac{R^2 C}{2L}}} \leq tmax$$

It can thus deduce a biunique relation from this formula relating load and device parameters with switch K1 and K2 command strategies used by element 3 in a PWM type process, such that the required wave can be synthesized at the terminals of the inductive (R, L) type load 5, and thus the required flux shape or magnetizing current can be created in this load 5, while avoiding the superoscillations mentioned above.

Due to its composition, the dc-ac converter element 4 outputs a voltage with a value varying between +E/2 and −E/2, to the load 5. In the case of an inductive load as shown in FIG. 4, the voltage 7 and the flux 8 being related by an integration relation extracted from the Lentz principle, the flux 8 generated from the voltage 7 PWM wave is therefore similar to a series of rising and falling ramps. The flux gradient depends on the pulse width, in other words the cyclic ratio of the switched wave servocontrolled by the PWM process.

An ingenious interpretation of this principle using the response of a magnetic circuit subjected to a voltage wave 7 built by a pulse width modulator enables good use of the frequency converter according to the invention. As shown in FIG. 5, by applying a voltage wave with a 1/2 cyclic ratio to the load, the flux 8 rises and falls by the same amount and oscillates like a sawtooth around a zero average value.

Pulse width control makes it possible to servocontrol the low frequency (LF) flux gradient with the required frequency and amplitude. As a special case, the consequence of continuously using a PWM with a cyclic ratio of 1/2 is that the frequency of the LF flux wave is zero and its shape reduces to a constant zero value. Since the flux wave can only be observed in the LF range, its origin can be attributed to the voltage wave component output from the PWM process, considered from the same low frequency point of view, namely UmLF.

By extrapolation it can thus be considered that if a PWM with a cyclic ratio of 1/2 is used, the magnetic circuit will behave as if it were powered by a zero UmLF voltage.

Extending this principle, servocontrol of pulse widths can enable the magnetic circuit to behave as if it sees a voltage with an amplitude x% of E/2 (where E is the direct voltage at the active filter output), where x varies from 0 (the case described in the previous paragraph) to 100, while C1 and C2 effectively see +E/2 or −E/2 at their terminals. It is thus possible for element 3 acting on switches K1 and K2 to servocontrol pulse widths in order to make the dc-ac converter element 4 work to step down the voltage applied to the inductive load 5 below voltage E.

Moreover, and this is true independently of the nature of the load, the active filter can step up the voltage E above Ur by acting on the active filter switch K5. The voltage E output by the active filter 2 increases as $t_{on}$ (the time during which switch K5 is in the passing state) increases. By varying $t_{on}$ very slowly with respect to the period of the voltage source Ue, a variable voltage E can be obtained. However the rate of change of E is limited by the need to not create harmonics on the network when the network is power supply source voltage Ue, and avoid the appearance of flickers (flickering brightness of a light source powered by the network). If Ur^ is the network peak voltage, E may be adjustable and always greater than Ur^ due to module 3 acting on the K5 $t_{on}$ time. Therefore the load operating range may be increased since the maximum value of the voltage is no longer limited to Ur^/2. Preferably, in order to avoid the acoustic nuisances, if fo is the upper limiting frequency of audible frequencies (fo the order of 15 kHz and more), the device will be dimensioned so that it will work under the following conditions:

$$\frac{1-\frac{Ur^{\wedge}}{E}}{2PL1} \geq \frac{f0}{Ur^{\wedge 2}} ;$$

where P is the power output at the load corresponding to the output voltage E.

This imposes the following condition on the $t_{on}$ of switch K5:

$$t_{on} \leq \frac{1-\frac{Ur^{\wedge}}{E}}{f0} .$$

As an asymptotic value, if the output voltage is E=Ur^, the voltage on load 5 will be Ur^/2. By controlling switches K1 and K2 as described in the previous paragraph, the operation of a load (R,L) can be regulated by the value of the voltage UmLF seen by the load 5 at its terminals less than or equal to Ur^/2 down to 0, regardless of the value Uê of the power supply source voltage for the frequency converter according to the invention.

Thus the synthesized voltage UmLF at the terminals of the load 5 may have a peak value less than the peak value Ur^ of the power supply source without needing to modify the frequency converter schematic, particularly without needing to add an additional switch to the active filter 2 in order to make it work as a voltage reducer. The dc-ac converter element 4 thus operates in the same way as a voltage reducer.

Therefore the frequency converter according to the invention has two functions additional to the described frequency converter functions:

- a regulator-step up function to compensate for fluctuations of Ue by keeping the voltage E supplied at the dc-ac converter element greater than Ur^, and to increase the value of the voltage E when the voltage Ue supplied by the network is too low for operation and to adapt the value of the voltage E to set value 16,
- a step down function to reduce the apparent voltage on the inductive load when the value of E supplied at the terminals of the dc-ac converter element 4 is too high for the required operating point.

Particularly interesting benefits can be obtained from joint use of these two step up and step down functions.

If the nominal value of C1=C2 is set with switches K1 and K2 open and at rest, the voltages at the terminals of C1 and C2 are Vc1=Vc2=E/2, and no current passes through load 5. When K1 and K2 come into action, a current ImLF passes through load 5 and a current IcLF passes through condensers C1 and C2, where IcLF increases as ImLF increases. Consequently there is a variation of Vc1 and Vc2 that become Vc1=E/2−u and Vc2=E/2+u, where u is a positive or negative voltage variation. This is represented on FIG. 6 that shows the variations of Vc1 (in dotted lines) and Vc2 (in solid lines) for three special values of E, E1<E2<E3.

This voltage variation u on condensers results in a deformation 71 and 72 of the voltage wave UmLF as shown for the value E1 of E on FIG. 7a, which is limited to the fundamental. Two solutions may be considered to overcome this problem:

- either increase the nominal value C of C1 and C2, which reduces variations of V1 and V2,
- or increase E using the active filter step up function, and use the dc-ac converter element step down function to modify the PWM control of K1 and K2 so that the synthesized UmLF is maintained. This then gives a result for which the principle is shown in FIG. 7c for a value of E equal to E3.

This solution can give the optimum use of a fixed value of C (C=C1=C2) provided that Vc1 and Vc2 do not exceed the maximum value that may be tolerated by C1 and C2.

If UmLf is a magnitude that is an image of the ratio of the amount of UmLF deformation achieved and the required UmLF, then using dUmLF as a control parameter makes it possible to adjust E to the strictly necessary value to obtain a UmLF wave shape quality without applying unnecessarily high voltage to C1, C2, K1 and K2 as shown for E being equal to E2 in FIG. 7b.

There is also another advantage that consists of minimizing the harmonic content of UmLF (and, therfore of ImLF and IcLF), which has the effect of limiting the rms ripple current from C1 and C2 as much as possible to its fundamental value.

If capacitances C1 and C2 have different nominal values, the voltages at their terminals V1 and V2 will be different and it will be possible to reestablish symmetry of the wave on the load by commands on the dc-ac converter element.

There is one particularly interesting wave shape for the power supply of an inductive load, namely a wave in which one half-period contains a plateau, the half-period of the wave preferably being in the shape of trapezoid and beneficially an isosceles trapezoid, where this plateau has a duration of T/6 where T is the period of the synthesized wave. This wave shape can give a better efficiency of the dc-ac converter element, where the advantages of this wave shape are described in the request entitled "Process for a power supply for an inductive load and device embodying this process" made by the requester on the same date as this request.

Another advantage of this invention is the use of the variation of UmLF, dUmLF, as a control parameter. If dUmLF0 is the magnitude of the maximum tolerable deformation on load 5, this value dUmLF0 can be taken as a set value to allow different types of servocontrol of the $t_{on}$ value of K5 in order to obtain the value of E to be supplied, and the PWM procedure can be used to provide the apparent percentage of E/2 on the load at all times without destroying either the shape or amplitude of the voltage wave UmLF applied to load 5.

The combination of regulator-step up function of the active filter 2 and the apparent regulator-step down function of the dc-ac converter module make it possible to make the power supply of an inductive load completely free from the source network, from 0 to kxUê/2 where k>1 is the maximum available ratio E/Uê for the power P to be supplied to the load.

All descriptions and advantages of the device according to this invention remain valid in the case of a power supply for a two-phase load 14 shown in FIG. 2. In this figure the same indexes have been used for equivalent elements. An additional bridge is added which is not required for the device shown in FIG. 1, this bridge being formed by an arm with the same condensers C1 and C2 as shown in FIG. 1 (the case of a single phase load) and another arm containing two switches K3 and K4, the two-phase load 14 being connected firstly between switches K1 and K2 and condensers C1 and C2, and secondly between condensers C1 and C2 and switches K3 and K4. The control element processing and command generation element 3 opens and closes switches K1 to K4 so as to apply a bipole voltage wave UmLF and a bipole voltage wave U'mLF out of phase with UmLF, to load 14.

As for the single phase and two-phase case, a three-phase dc-ac converter coupled with an active filter 2 can be used as shown in FIG. 8, for operation similar to that described in the previous cases. In this figure, the three-phase dc-ac converter 20 contains three bridge arms composed of switches K1 and K2, K3 and K4, K6 and K7, the three-phase load 19 being connected to each arm between pairs of switches. In the example shown in FIG. 8, the condenser C3 is placed below switches, but it is obvious that there may be several condensers and that they may be located elsewhere provided that they remain in parallel with the switch arms.

In the same way as in the single phase and two-phase cases, block B5 contains control parameters for the dc-ac converter element 20 and B6 contains control parameters for the three-phase load 19. Starting from set values 16, block 3 processes these parameters and controls switches K1, K2, K3, K4, K6 and K7 through connections 21, so that the device synthesizes three out-of-phase waves at the load 19 terminals, beneficially with the shape described above. This device makes it possible to combine the step up functions of the active filter 2 and apparent step down function of the dc-ac converter element 20 seen by a three-phase inductive load as described in the previous cases with the related advantages.

This invention applies to all types of loads that can be controlled using frequency dc-ac converters, and particularly to a transformer type inductive load or ac electric motors with or without commutators, and particularly to single phase and multi-phase asynchronous motors.

What is claimed is:

1. A static frequency converter comprising an active filter coupled to terminals of a DC/AC converter powering a load comprising:
   a rectifier having a plurality of terminals;
   a condenser performing high frequency filter at the terminals of the rectifier;
   the active filter including a series inductance connected to the rectifier and to a parallel switch controlled by a control parameter processing and command generation element, a series diode connected to a terminal of the switch and to an input of the DC/AC converter;
   said DC/AC converter comprising at least one bridge arm including two switches and at least one condenser, all the switches of said frequency converter being controlled by said control parameter processing and command generation element;
   wherein said rectifier, said condenser at the terminals of the rectifier, said series inductance, said series diode, all said switches of said frequency converter and said at least one condenser have values so that:

$$\frac{1 - \frac{\hat{Ur}}{E}}{2PL1} \geq \frac{fo}{\hat{Ur}^2}$$

and:

$$t_{on} \leq \frac{1 - \frac{\hat{Ur}}{E}}{fo}$$

where $\hat{UR}$ is the peak voltage of a voltage source supplying said static frequency converter, E is the voltage output by the active filter, P is the power output at the load, L1 is the value of said series inductance, of is the upper limit of audible frequencies and $t_{on}$ is the closing time of the active filter parallel switch.

2. A static frequency converter comprising an active filter coupled to terminals of a DC/AC converter powering a load comprising:
   a rectifier having a plurality of terminals;
   a condenser performing high frequency filtering at the terminals of the rectifier;
   the active filter including a series inductance connected to the rectifier and to a parallel switch controlled by a control parameter processing and command generation element, a series diode connected to a terminal of the switch and to an input of the DC/AC converter;
   said DC/AC converter comprising at least one bridge arm including two switches and at least one condenser, all the switches of said frequency converter being controlled by said control parameter processing and command generation element;
   wherein said rectifier, said condenser at the terminals of the rectifier, said series inductance, said series diode, all said switches of said frequency converter and said at least one condenser have values so that:

$$\frac{2\pi \sqrt{2LC}}{\sqrt{1 - \frac{R^2C}{2L}}} \geq tmax$$

where C is the nominal value of said at least one condenser, L is the inductance of the inductive load and tmax is the maximum time during which voltage output by the active falter must be applied to the load.

* * * * *